Nov. 7, 1933.　　　　W. BADER　　　　1,933,696
MANUFACTURE OF ALIPHATIC COMPOUNDS
Filed June 17, 1930
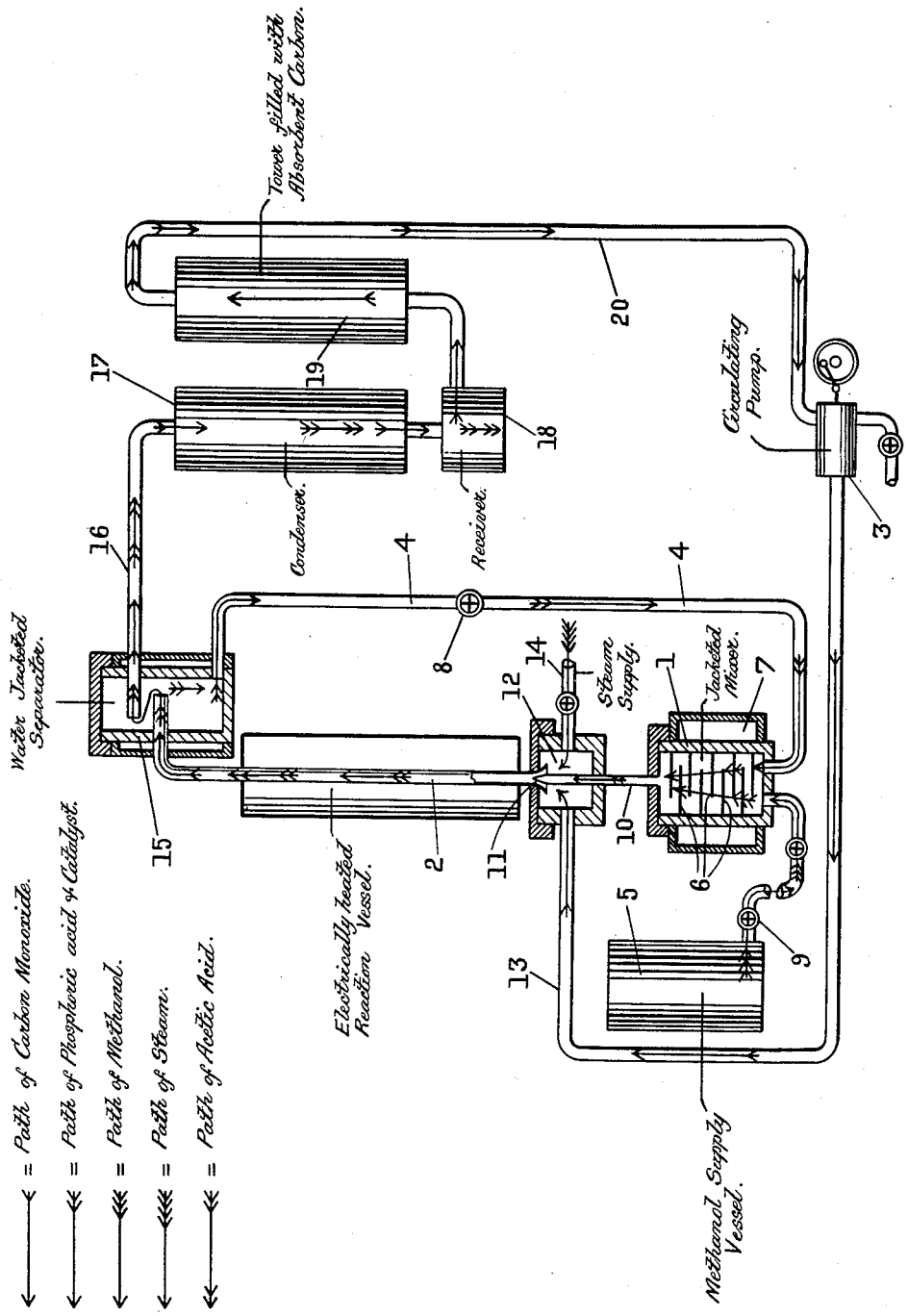
Inventor:
Walter Bader Patented Nov. 7, 1933

1,933,696

UNITED STATES PATENT OFFICE 1,933,696

MANUFACTURE OF ALIPHATIC COMPOUNDS

Walter Bader, Spondon, near Derby, England, assignor to Celanese Corporation of America, a corporation of Delaware Application June 17, 1930, Serial No. 461,715, and in Great Britain July 27, 1929

22 Claims. (Cl. 260—116)

This invention relates to the manufacture of aliphatic acids and other aliphatic compounds and is an improvement in or modification of the invention described in previous United States patent application S. No. 138,116, now Patent No. 1,864,643.

In the said United States patent application S. No. 138,116 it has been shown inter alia how aliphatic acids (as such or in the form of their esters) can be produced by reacting upon aliphatic alcohols with carbon monoxide (or gases containing the same) in presence of inorganic acid catalysts, namely inorganic acids or inorganic acids containing organic groups or acid salts of such acids.

According to the invention it has been found that aliphatic acids (as such or in the form of their esters) may be produced in a highly satisfactory manner by mixing liquid methanol or other liquid aliphatic alcohol with one or more of the inorganic acid catalysts and submitting the resulting mixture to reaction with carbon monoxide.

For the purposes of the invention it is preferable to mix one or more inorganic acids such as a phosphoric acid (e. g. orthophosphoric acid, pyrophosphoric acid or metaphosphoric acid or mixtures of any of such phosphoric acids) with liquid methanol or other liquid aliphatic alcohol and subject the resulting mixture to reaction with carbon monoxide.

The liquid aliphatic alcohol and the inorganic acid catalyst or catalysts may of course be mixed together under any suitable conditions. Preferably however the mixing is performed under such conditions (e. g. of temperature) that a partial or complete esterification of the alcohol is effected by the phosphoric acid or other inorganic acid catalyst employed.

In performing the invention the mixture resulting from the admixture of the aliphatic alcohol and the inorganic acid catalyst or catalysts may be caused to react with the carbon monoxide in any convenient way. The reaction with the carbon monoxide can be performed at atmospheric pressure, but proceeds more rapidly at increased pressures. The pressure may be as high as 100, 200 or 300 atmospheres or any higher pressures that can conveniently be attained in practice. The range of temperatures usually employed for the reaction with the carbon monoxide is from about 200°–250° to about 400°–450° C., temperatures of 300°–400° C. being preferably adopted.

According to one convenient form of execution of the invention the mixture resulting from the admixture of the liquid aliphatic alcohol and the inorganic acid catalyst or catalysts injected may be sprayed or otherwise introduced into a stream of carbon monoxide or a gas containing the same (e. g. producer gas, water gas or the like). In such form of execution a stream of carbon monoxide (or gas containing the same) may conveniently be passed, or repeatedly circulated, under the desired pressure, through a reaction zone heated to the desired temperature (e. g. 300° to 400° C.) and the said mixture may be injected or sprayed into the hot reaction zone or injected, sprayed or otherwise introduced into the stream of carbon monoxide (or gas containing the same) and carried thereby (for instance as a climbing film) into the heated reaction zone. The catalyst or catalysts may be caused to pass continuously from the reaction zone to a chamber wherein it is mixed with further liquid methanol or other liquid aliphatic alcohol and the resulting mixture submitted to reaction with further carbon monoxide (or gas containing the same). Further, if desired, the reaction gases may, after condensing therefrom methyl acetate, acetic acid or other liquefiable products, be returned to react with further quantities of the said mixture resulting from the admixture of the liquid aliphatic alcohol and the acid catalyst or catalysts. By these means the process can be performed as a continuous cycle of operations.

As previously stated, the aliphatic acids formed by the process of the invention may be obtained either in the free state or in the form of their esters which are formed by condensation of the aliphatic acids with the aliphatic alcohols employed. The reaction can be so directed as to give the esters of the aliphatic acids (e. g. methyl acetate) practically exclusively. The production of an ester is favoured by the presence of excess of aliphatic alcohol in the reaction chamber and the absence of water or the use of only small amounts of water. If, however, no excess of the aliphatic alcohol is used and water is present in sufficient quantities, free aliphatic acid is obtained, while mixtures of free aliphatic acid and ester in various proportions can be obtained in accordance with the conditions adopted.

I preferably perform the reaction in presence of water. The water may be introduced in any convenient manner as for instance by employing an aqueous aliphatic alcohol (e. g. containing 50% water) for admixing with the inorganic acid catalyst or catalysts. I prefer, however, to employ substantially anhydrous alcohol for admixture with the inorganic acid catalyst or catalysts, so as to promote the highest possible esterification of the alcohol, and to introduce the water separately into the reaction zone, for instance by adding water vapour to the carbon monoxide, or for instance by introducing water vapour at a different point into the reaction zone.

Any ester present in the products of reaction may be converted to the free acid by any convenient method of saponification. Such saponification may advantageously be performed by the process described in British patent specification No. 284,582 which enables the saponification to be controlled in such manner as to produce the free acids in the anhydrous condition. The said process consists in effecting the saponification by means of just the theoretical amount of water required for the reaction, a strong mineral acid, e. g. phosphoric acid or sulphuric acid, being used as the saponifying agent.

The reaction proceeds according to the equation:—

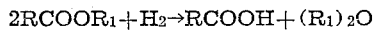

It is preferred to use phosphoric acid as the saponifying agent, since it does not act as an oxidizing agent at the temperatures employed. The reaction takes place at temperatures between about 150° and about 300°, temperatures between 180° and 210° C. being especially advantageous.

The more highly hydrated forms of phosphoric acid, e. g. orthophosphoric acid and pyrophosphoric acid are capable of supplying the water required for the saponification, being themselves at the same time dehydrated to form metaphosphoric acid. It is therefore possible to perform the reaction in a continuous manner by introducing supplies of ester and water in the requisite proportions into the phosphoric acid, the phosphoric acid serving in effect as a carrier for water.

The saponification may be carried out in any apparatus designed for interaction of gases and liquids, e. g. wash towers, mixers, bubblers.

For the purposes of the present invention the saponification may be effected, if desired, by leading the reaction products in vapour form together with the requisite amount of steam continuously into contact with the phosphoric acid or other strong mineral acid.

In cases where the reaction of the invention is performed under elevated pressures it is preferable to expand the products of reaction to lower pressures (e. g. atmospheric) before submitting them to the saponification.

The accompanying diagrammatic drawing serves to illustrate a convenient form of execution of the invention, it being understood that this form is given only by way of illustration and is in no way limitative.

Referring to the drawing, 1 is a jacketed mixing vessel wherein methanol and phosphoric acid are mixed prior to subjecting them to the action of the carbon monoxide.

2 is a tube forming the reaction vessel, this tube being lined with gold, graphite or other metal resistant to the action of carbon monoxide, phosphoric acid and acetic acid, and being heated electrically to the temperature of reaction, e. g. 300°–400° C.

3 is the circulating pump which circulates the gas round the system under the desired pressure, e. g. 150–188 atmospheres.

The mixing vessel 1 is fed continuously with phosphoric acid and methanol, the vessel being fed with phosphoric acid by gravity by the pipe 4 and with methanol (preferably anhydrous methanol) by the supply vessel 5. The vessel 1 is provided with baffles 6 to ensure good mixing. The mixing vessel 1 is preferably kept at a somewhat elevated temperature (e. g. between 60 and 90° C.) to promote esterification of the methanol as far as possible. For instance the vessel may be heated to such temperature initially by passing steam through the jacket 7, whereafter the necessary heat may be supplied by the heated catalyst returning (in the manner hereinafter described) from the reaction vessel. If desired or necessary cooling water may be circulated through the jacket 7 to control the temperature of the mixing vessel. While I in nowise limit myself to any particular relative proportions of phosphoric acid or methanol to be employed, I prefer to use mixtures containing at least ⅓ to 1 part of methanol to each part of phosphoric acid or mixtures containing larger proportions of methanol, e. g. 2–10 parts of methanol for each part of phosphoric acid. The relative proportions of phosphoric acid and methanol may be controlled by the valves 8 and 9. The mixture passes from the mixer 1 via the pipe 10 to the jet 11 and thence into the reaction vessel 2.

Carbon monoxide (or gas containing the same) and steam are introduced into the preheater 12 respectively by the pipes 13 and 14 and pass into and up through the reaction vessel 2. In so passing they carry the methanol from the jet 11 up through the reaction vessel as a climbing film on the walls. The preheater is kept at a temperature well above the boiling point of water, e. g. 130–200° C. or more by any convenient means, e. g. by heat exchange with the hot gases leaving the reaction vessel. I preferably introduce steam via the pipe 14 in amount between 20–60% of the amount of methanol introduced from the vessel 5, but I of course in nowise limit myself in any respect to the amount of steam so introduced.

The products of the reaction pass from the reaction tube or vessel 2 to a separator 15 which is maintained at a temperature sufficiently high to avoid condensation of the acetic acid, methyl acetate and other volatile products of reaction, e. g. to a temperature between 150° and 200° C. From the separator 15 the volatile products pass via the pipe 16 to the condenser 17 wherein the bulk of the acetic acid and methyl acetate produced is condensed and passes to the receiver 18.

From the receiver 18 the uncondensed gases or vapours pass to and through the tower 19 which is filled with absorbent charcoal and wherein the residue of the acetic acid, methyl acetate and other vapours produced is eliminated and the gases are passed on from the tower 19. The gas passes via the pipe 20 and pump 3 for recirculation through the system.

During the passage from the reaction tube any phosphoric acid previously esterified becomes reconverted to free acid so that the "catalyst" leaves the tube 2 in the form of free acid. The "catalyst" passes from the separator 15 via the pipe 4 to the mixer 1 for admixture with further methanol and recirculation through the system.

If it is desired to obtain the acetic acid largely or entirely in the form of methyl acetate the separator 15 can conveniently be maintained at a lower temperature, e. g. about 80° C. to allow the methyl acetate to pass on whilst condensing any acetic acid present in the vapours. Acetic acid so condensed returns to the mixer 1 together with the acid catalyst and becomes esterified to methyl acetate by reaction with methanol in the mixer. In such a form of execution somewhat lower proportions of water (e. g. about 10 to 30% of the amount of methanol introduced) can advantageously be employed.

What I claim and desire to secure by Letters Patent is:—

1. Process for the manufacture of oxygenated organic compounds which comprises mixing an aliphatic alcohol with at least one inorganic acidic catalyst containing at least one acidic hydroxyl group directly linked to a non-metallic element and submitting the resulting mixture to reaction with carbon monoxide.

2. Process according to claim 1 and comprising introducing said mixture of alcohol and catalyst into a heated reaction zone and passing a stream of carbon monoxide under pressure through said zone.

3. Process according to claim 1 and comprising continuously introducing the mixture of alcohol and catalyst into a heated reaction zone, continuously passing a stream of carbon monoxide under pressure through said zone, causing said inorganic acid catalyst to pass continuously from said zone, admixing said catalyst leaving said zone with further alcohol, and recirculating it continuously to the heated reaction zone.

4. Process for the manufacture of oxygenated organic compounds which comprises mixing an aliphatic alcohol with at least one inorganic acidic catalyst containing at least one acidic hydroxyl group directly linked to a non-metallic element and submitting the resulting mixture to reaction with carbon monoxide at a temperature between 200° and 450° C. and under pressure.

5. Process for the manufacture of oxygenated organic compounds which comprises mixing methanol with at least one inorganic acidic catalyst containing at least one acidic hydroxyl group directly linked to a non-metallic element and submitting the resulting mixture to reaction with carbon monoxide.

6. Process for the manufacture of oxygenated organic compounds which comprises mixing methanol with at least one inorganic acidic catalyst containing at least one acidic hydroxyl group directly linked to a non-metallic element and submitting the resulting mixture to reaction with carbon monoxide at a temperature between 200° and 450° C. and under pressure.

7. Process for the manufacture of oxygenated organic compounds which comprises mixing an aliphatic alcohol with at least one phosphoric acid and submitting the resulting mixture to reaction with carbon monoxide.

8. Process for the manufacture of oxygenated organic compounds which comprises mixing an aliphatic alcohol with at least one phosphoric acid and submitting the resulting mixture to reaction with carbon monoxide at a temperature between 200° and 450° C. and under pressure.

9. Process for the manufacture of oxygenated organic compounds which comprises mixing methanol with ortho-phosphoric acid and subjecting the resulting mixture to reaction with carbon monoxide.

10. Process for the manufacture of oxygenated organic compounds which comprises mixing methanol with ortho-phosphoric acid and subjecting the resulting mixture to reaction with carbon monoxide at a temperature between 200° and 450° C. and under pressure.

11. Process for the manufacture of oxygenated organic compounds which comprises mixing an aliphatic alcohol with at least one inorganic acidic catalyst containing at least one acidic hydroxyl group directly linked to a non-metallic element at an elevated temperature to effect at least partial esterification of said alcohol by said inorganic acid catalyst, and submitting the resulting mixture to reaction with carbon monoxide.

12. Process for the manufacture of oxygenated organic compounds which comprises mixing methanol with at least one inorganic acidic catalyst containing at least one acidic hydroxyl group directly linked to a non-metallic element at an elevated temperature to effect at least partial esterification of the methanol by said inorganic acid catalyst and submitting the resulting mixture to reaction with carbon monoxide.

13. Process for the manufacture of oxygenated organic compounds which comprises mixing methanol with ortho-phosphoric acid at a temperature between 60° and 90° C. to effect at least partial esterification of the methanol by the phosphoric acid and subjecting the resulting mixture to reaction with carbon monoxide.

14. Process for the manufacture of oxygenated organic compounds which comprises mixing methanol with ortho-phosphoric acid at a temperature between 60° and 90° C. to effect at least partial esterification of the methanol by the phosphoric acid and subjecting the resulting mixture to reaction with carbon monoxide at a temperature between 200° and 450° C. and under pressure.

15. Process for the manufacture of oxygenated organic compounds which comprises mixing an aliphatic alcohol with at least one inorganic acid catalyst containing at least one acidic hydroxyl group directly linked to a non-metallic element and submitting the resulting mixture to reaction with carbon monoxide in presence of water vapor.

16. Process for the manufacture of oxygenated organic compounds which comprises mixing methanol with at least one inorganic acidic catalyst containing at least one acidic hydroxyl group directly linked to a non-metallic element and submitting the resulting mixture to reaction with carbon monoxide in presence of water vapor.

17. Process for the manufacture of oxygenated organic compounds which comprises mixing methanol with ortho-phosphoric acid and subjecting the resulting mixture to reaction with carbon monoxide at a temperature between 300° and 400° C. under pressure and in presence of water vapor.

18. Process for the manufacture of oxygenated organic compounds which comprises mixing methanol with ortho-phosphoric acid at a temperature between 60° and 90° C. to effect at least partial esterification of the methanol by the phosphoric acid and subjecting the resulting mixture to reaction with carbon monoxide at a temperature between 300° and 400° C. under pressure and in presence of water vapor.

19. Process for the manufacture of oxygenated organic compounds which comprises mixing an aliphatic alcohol with at least one inorganic acidic catalyst containing at least one acidic hydroxyl group directly linked to a non-metallic element and submitting the resulting mixture to reaction with carbon monoxide in presence of an amount of water vapor between 20 and 60% of the aliphatic alcohol.

20. Process for the manufacture of oxygenated organic compounds which comprises mixing methanol with at least one inorganic acidic catalyst containing at least one acidic hydroxyl group directly linked to a non-metallic element and submitting the resulting mixture to reaction with carbon monoxide in presence of an amount of water vapor between 20 and 60% of the methanol.

21. Process for the manufacture of oxygenated organic compounds which comprises mixing methanol with ortho-phosphoric acid and subjecting the resulting mixture to reaction with carbon monoxide at a temperature between 300° and 400° C. under pressure and in presence of an amount of water vapor between 20 and 60% of the methanol.

22. Process for the manufacture of oxygenated organic compounds which comprises mixing methanol with ortho-phosphoric acid at a temperature between 60° and 90° C. to effect at least partial esterification of the methanol by the phosphoric acid and subjecting the resulting mixture to reaction with carbon monoxide at a temperature between 300° and 400° C. under pressure and in presence of an amount of water vapor between 20 and 60% of the methanol.

WALTER BADER.

Certificate of Correction

Patent No. 1,933,696. November 7, 1933.

WALTER BADER

It is hereby certified that error appears in the printed specification of the above numbered patent requiring correction as follows: Page 2, line 22, for the central portion of the equation "$H_2$" read $H_2O$; page 3, line 26, claim 3, strike out the words "inorganic acid"; and that the said Letters Patent should be read with these corrections therein that the same may conform to the record of the case in the Patent Office.

Signed and sealed this 28th day of November, A. D. 1933.

[SEAL] F. M. HOPKINS,
*Acting Commissioner of Patents.*